July 9, 1968

C. PAVIA 3,391,719

FOOD COMMINUTING MECHANISM

Filed Oct. 21, 1965

INVENTOR
CHARLES   PAVIA

BY
ATTORNEY

July 9, 1968   C. PAVIA   3,391,719
FOOD COMMINUTING MECHANISM
Filed Oct. 21, 1965   2 Sheets-Sheet 2
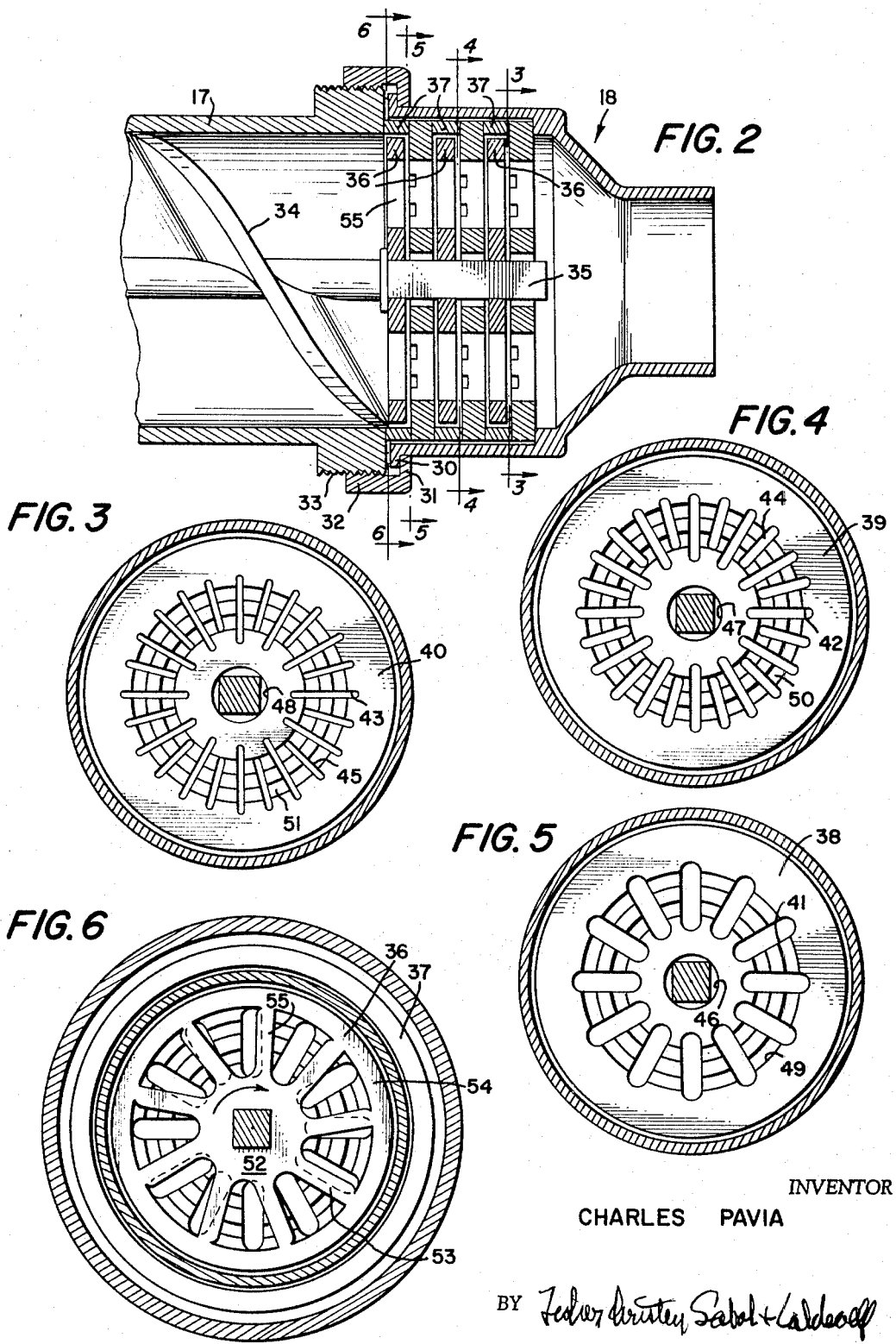
INVENTOR
CHARLES PAVIA
BY
ATTORNEY

United States Patent Office 3,391,719
Patented July 9, 1968

3,391,719
FOOD COMMINUTING MECHANISM
Charles Pavia, R.F.D. 1, Box 244–A,
Luray, Va. 22835
Filed Oct. 21, 1965, Ser. No. 499,144
4 Claims. (Cl. 146—187)

ABSTRACT OF THE DISCLOSURE

A fixed plate or series of plates for a comminuting mechanism is provided with generally radially arranged slots for cooperation with a rotating knife or knives, the surface of the fixed plate adjacent the knife also being provided with radially arranged concentric slots.

This invention relates to food products, and more particularly to a continuous process for producing cooked sausage links.

Another object of the invention is to provide a novel mechanism for comminuting food products, especially such products as meat for use in producing sausage.

Other objects and advantages will be apparent to those skilled in the art after reading the following specification in connection with the accompanying drawings, in which:

FIGURE 2 is an enlarged cross-sectional elevation of the outlet portion of the grinding mechanism shown in FIG. 1, and;

FIGURES 3–6 are cross-sectional views taken on the lines 3—3, 4—4, 5—5 and 6—6 respectively.

Figure 1:
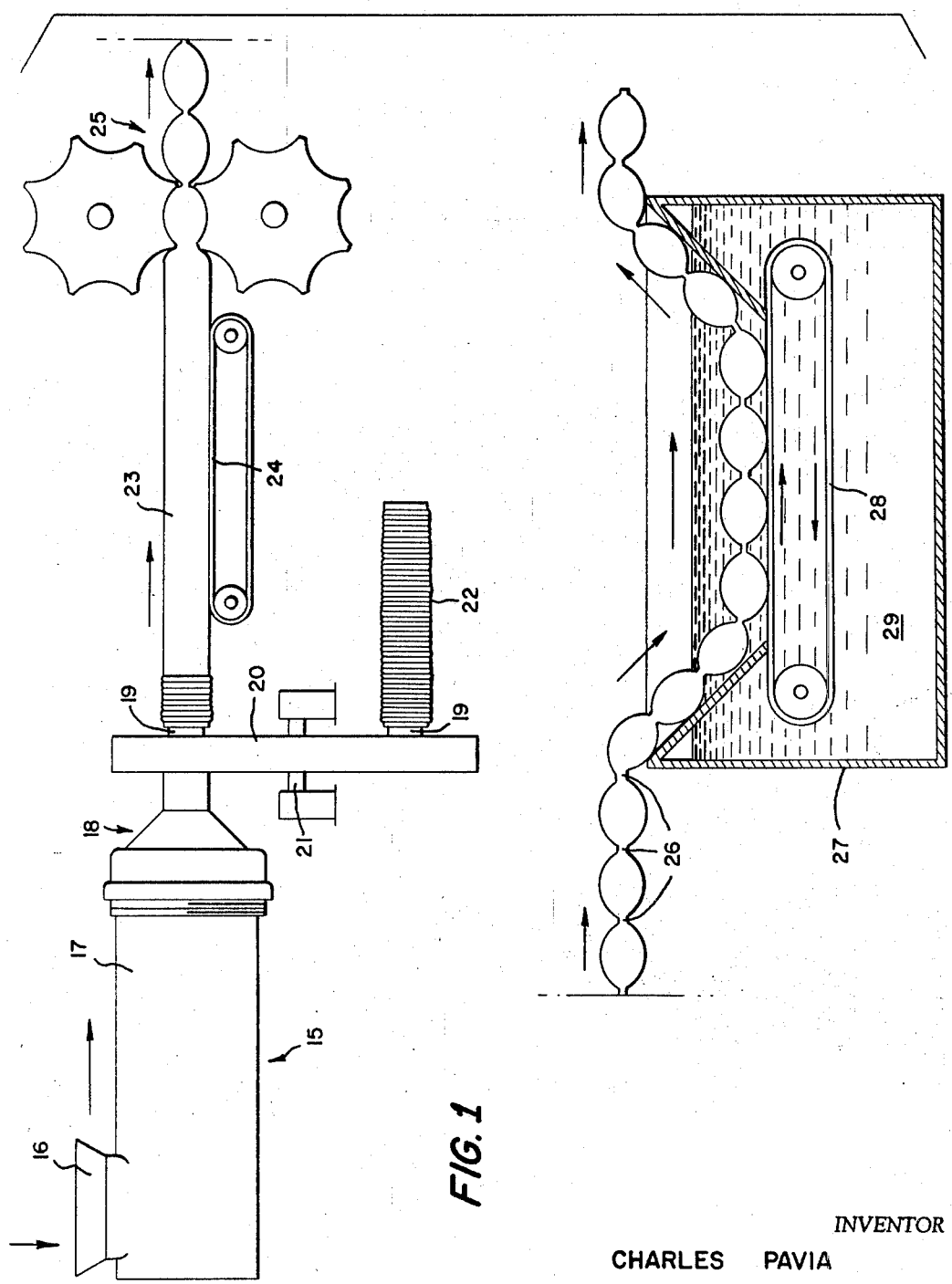
FIGURE 1 is schematic view of a preferred form of continuous sausage making process according to the present invention.

In the drawings, the numeral 15 indicates a meat grinder generally having a hopper 16 at one end into which the chunks of meat are fed to be carried through the elongated tubular housing 17 by conventional screw conveyor and fed to a series of rotating knives and stationary plates (which will be described in detail later) and thereafter are extruded through an outlet 18 into a series of horns 19 mounted on a supporting member 20 for rotation on a horizontal axis 21 whereby each of the horns may be successively brought into horizontal alignment with the outlet 18.

In the operation of the process an empty sausage casing, indicated by numeral 22 is placed on one of the disengaged horns while the casing 23 is being filled from the horn 19 which is disposed at the outlet from the grinder. These casings can be of almost any length, usually several yards long, and may be initially supported on an endless conveyor system 24 after which they pass through a linker mechanism, indicated generally by numeral 25. This linker contracts and squeezes together the casing, causing the wall to adhere together at longitudinally spaced intervals indicated by numeral 26.

After the links have been formed they pass into a vessel 27 and downwardly onto a second endless conveyor 28. The vessel is kept filled with boiling water 29 and the level of the conveyor is such that as the links pass through the vessel, the meat contained therein will be thoroughly cooked. At the same time the effect of the boiling water will be to permanently seal the joints 26. After the cooking process is completed the links pass outwardly from the vessel for cooling and further storage.

It should be noted that after a casing 23 has completely filled, the rotating support 20 with its hitherto unengaged horn can be moved into position with the previously prepared empty casing 22 placed in alignment with the outlet 18 and the continuous process of filling the new casing may be continued. In the meantime the casing 23 is removed from the horn and another empty casing replaced thereon in preparation for its later positioning at the outlet 18.

FIGURES 2–6 illustrate details of the outlet portion 18 of the food comminuter shown in FIGURE 1 from which it can be seen that this outlet comprises a generally bell shaped housing having an annular flange 30 at its larger end which engages with the inwardly directed flange 31 of an internally threaded ring shaped member 32 for removable engagement with an external set of threads 33 surrounding the housing 17 at its outlet end. Within the housing is a conventional screw conveyor 34 which terminates at its discharge end with a concentrically positioned longitudinally extending square shaft 35. Slidably positioned on the shaft are a series of substantially identical knives 36 each of which is surrounded by an annular spacer 37. Alternately spaced between the knives and spacers are a series of fixed plates 38, 39 and 40, these plates being held in fixed position by abutting engagement with the spacers 37 and the force exerted by the ring 32 on the housing 18.

The stationary plates are provided with a series of radial openings or slots which extend completely through the plates but the width of these slots varies in decreasing proportion from one plate to the other. For example, the first stationary plate 38 is provided with a series of radial slots 41 which are approximately twice the width of the radial slots 42 and the succeeding stationary plates 39 and again in the case of the plate 40 and the radial slots 43 are approximately one half the width of the slots 42.

In addition, while the principal slots 41, 42 and 43 respectively in each of the plates extends from an area adjacent the center of the plate out towards an area adjacent the periphery, certain plates such as plate 39 and 40 may have additional series of slots 44 and 45 respectively extending from the periphery inwardly but only a fraction of the distance from the major openings, the number and length of these subsidiary openings being dependent on the structural strength of the plate. Needless to say, plates 38, 39 and 40 also have central openings 46, 47 and 48 of sufficient size to permit free turning of the square shaft 35. In addition, the plates are provided respectively with a series of concentrically spaced annular straight-sided recesses 49, 50 and 51 respectively, on their front side.

All of the rotating knives 36 are similar, having a hub portion 52 provided with a square opening in the center for a sliding fit on the shaft 35. The blades 53 project outwardly from the hub and may be joined at their outer ends by a peripheral ring 54 to give added strength. The forward working surfaces 55 are substantially flat and disposed in a plane which extends longitudinally with respect to the axis of rotation but which does not intersect it. In other words, while the working surfaces of the stationary plates are disposed generally in a radial plane the working surfaces of the knives are not radially arranged but at a slight angle with respect to a radius so that as the blades rotate the point of contact between the working surface of the knives and the surfaces of the slots moves outwardly from the center as will be evident from an examination of FIGURE 6. This prevents overloading of the mechanism and insures that the resulting product will be more thoroughly comminuted. Generally speaking, the relative angle between the working surfaces of the knives and the plates should not exceed approximately 20°, to prevent clogging of the plate openings.

Having disclosed a preferred form in which the invention can be practiced, it will be obvious to those skilled in the art that various changes and modifications can be made which would fall within the scope of the annexed claims.

I claim:

1. Comminuting apparatus for food products of the type wherein a product is conveyed through a tubular member having a transverse fixed comminuting plate and a member coacting with the fixed plate and revoluble about the central axis of the tubular member, said fixed plate having one face lying in a flat plane transverse to the axis of the tubular member, said plate having a plurality of slots extending axially from one face to the other extending generally radially inwardly from adjacent the outer margin of the plate, said revoluble member including a plurality of circumferentially spaced fingers extending outwardly from the center at least as far as the outer termination of said slots, each of the fingers having a flat plane surface for sliding contact with the flat face of the plate, said plate being also provided with a plurality of concentrically spaced annular recesses extending partially into the plate from the surface adjacent the fingers.

2. The invention as defined in claim 1, wherein said fingers and slots are disposed angularly with respect to each other.

3. Comminuting mechanism comprising an elongated tubular housing having an inlet at one end, rotary screw conveyor means in the housing for moving material from the hopper toward the other end, a plurality of knife means secured to the rotary conveyor at the other end, a plurality of stationary plates, each of said plates being fabricated in accordance with the fixed plate defined in claim 1, and being arranged to coact with a respective knife, successive ones of said plates in the direction of movement of the comminuted material having openings therethrough of progressively smaller size.

4. The invention as defined in claim 3, wherein a bell shaped housing having an outlet nozzle is removably secured to the other end of the tubular housing, and said knives are surrounded by annular spacers between the stationary plates.

References Cited

UNITED STATES PATENTS

| 970,593 | 9/1910 | Yeakel | 146—189 |
| 2,661,040 | 12/1953 | Guldering | 146—187 X |
| 3,221,788 | 12/1965 | Hughes | 146—192 X |

FOREIGN PATENTS

| 10,915 | 12/1928 | Australia. |
| 685,458 | 12/1939 | Germany. |
| 9,604 | 1895 | Great Britain. |

W. GRAYDON ABERCROMBIE, *Primary Examiner.*